United States Patent [19]

Schoepe

[11] 4,108,202
[45] Aug. 22, 1978

[54] BALL COCK HAVING VERTICALLY ADJUSTABLE OUTLET TUBE

[76] Inventor: Adolf Schoepe, 1620 N. Raymond Ave., Fullerton, Calif. 92631

[21] Appl. No.: 706,484

[22] Filed: Jul. 19, 1976

[51] Int. Cl.² ............... F16k 31/18; F16l 15/02
[52] U.S. Cl. .................... 137/436; 4/353; 4/366; 137/442; 285/89; 285/92; 285/390; 285/303; 285/322
[58] Field of Search .............. 4/18 A, 41, 56; 137/414, 426, 429, 434, 442, 443, 451, 436, 437, 438; 285/89, 92, 298, 302, 390, 303, 322

[56] References Cited

U.S. PATENT DOCUMENTS

| 447,078 | 2/1891 | Morgan | 285/390 |
|---|---|---|---|
| 1,209,008 | 12/1916 | Messina | 285/303 |
| 1,542,553 | 6/1925 | Hornbeck | 285/303 |
| 2,098,581 | 11/1937 | Jones | 285/322 |
| 2,383,692 | 8/1945 | Smith | 285/322 |
| 2,827,073 | 3/1958 | Owens | 137/437 |
| 3,669,138 | 6/1972 | Schoepe et al. | 137/429 |
| 3,797,518 | 3/1974 | Holm et al. | 137/434 |

FOREIGN PATENT DOCUMENTS

| 281,458 | 7/1944 | Switzerland | 137/436 |
|---|---|---|---|
| 330,123 | 6/1930 | United Kingdom | 285/390 |

Primary Examiner—Martin P. Schwadron
Assistant Examiner—G. L. Walton
Attorney, Agent, or Firm—Mahoney, Schick & Cislo

[57] ABSTRACT

An end of an inlet tube communicates through a tank wall with a water supply and an inner end of the inlet tube communicates through a float controlled valve with a generally vertically downwardly extending outlet tube. Thus, the tank water level through the float controls closing and opening of the valve admitting water through the inlet tube, through the valve and down the outlet tube flowing into the tank from the outlet tube lower end. The outlet tube is selectively vertically adjustable to adapt to various depths of tank by being formed of telescoped parts normally retaining a determined telescoping by a projection of one part being radially interengaged in a groove of the other part. Depending on the particular construction, the tube part telescoping may be selectively varied by either relative rotation between the parts or by disengaging and reengaging the interengagement between the parts. Through a slot and lock collar arrangement, the tube parts may be totally telescopically separated.

4 Claims, 6 Drawing Figures

4,108,202

BALL COCK HAVING VERTICALLY ADJUSTABLE OUTLET TUBE

BACKGROUND OF THE INVENTION

This invention relates to a ball cock construction of the type for controlling the level of liquids, such as water, in tanks and the like. More particularly, the ball cock of the present invention is formed with a uniquely vertically adjustable outlet tube which may be selectively vertically adjusted to tanks of varying depth, thereby adapting a single size of ball cock to a multiplicity of tank sizes. Furthermore, although the principles of the present invention are illustrated herein incorporated in embodiments of a side inlet ball cock for mounting on a tank sidewall, such principles may be relatively easily adapted to tank bottom wall mounted ball cocks, all well within the purview of those skilled in the art.

Various prior forms of float controlled ball cocks have heretofore been provided for the primary purpose of automatically controlling the flow into and the level of liquids within various types of liquid storage tanks. Probably the major use of such ball cocks is in toilet water storage tanks wherein the supply water is received into the tank through a wall thereof by the inlet tube of the ball cock, passes through a float controlled valve and vertically downwardly through a ball cock outlet tube ultimately emptying into the inner confines of the tank through an inlet tube lower end. A float properly connected to the ball cock valve, raised and lowered by the tank water level, controls the opening and closing of the ball cock valve to thereby determine and maintain the desired water level within the tank. A separate and selectively operable outlet valve of the tank is operated to exhaust the water from the tank and through the toilet for flushing with the ball cock admitting a further supply of water into the tank for refilling and maintaining the level of water therein ready for the next selective flushing action.

One of the major difficulties with the existing prior ball cock constructions prior to that of the present invention has been that these prior ball cock constructions have been formed of an average or standard predetermined height so as to be functional only in storage tanks of relatively standardized configuration. Certain of these prior ball cocks have included provisions for float adjustment in order to provide water level control adjustment within preset, rather narrow limits, that is, with the floats directly connected to and controlling the ball cock valves, linkage adjustments have been provided between the floats and valves so that the ultimate controlled closing of the valves can be slightly varied to thereby slightly vary the level of water maintained within the tanks. Time has proven, however, that this slight water level control variance by the prior ball cocks has not been sufficient to adapt a standard ball cock height to the increasingly wide variety of tank configurations within which such ball cocks are required to be used. This has resulted in the necessity of manufacturing a series of models of ball cocks, each model having a different vertical height so as to be adaptable to a particular tank contour. With even increasing variance requirements of modern tank designs and particularly in the home plumbing field, such being coupled with fast rising manufacturing and material costs, the problems involved with multiple ball cock models adaptable to varying vertical heights has become quite prohibitive and has created an unwanted necessity of greatly limiting possible variations in tank design.

There has been one known prior ball cock construction which has been formed to permit selective vertical adjustment thereof, that is, selective vertical adjustment of the overall height thereof in order to adapt the same for widely varying water level requirements occasioned by differences in storage tank configuration. In this case, the ball cock construction has been of the tank bottom wall mounted type and has consisted of spaced, side by side inlet and outlet tubes, each formed with end telescoped, upper and lower tube parts vertically slideably sealed by resilient O-rings between the two parts. As a result, the major problem with this prior form of ball cock has been the ease with which the adjusted height thereof can be accidentally changed. With frictional forces being virtually the sole deterrent to ball cock vertical height changing movement, slight vertical forces and even possibly internal water pressure can easily change the vertical height thereof to a lesser or greater level and thereby change the maintainment of water level in the tank to an unworkable level.

OBJECTS AND SUMMARY OF THE INVENTION

It is, therefore, an object of this invention to provide a ball cock construction for controlling the level of liquids, such as water, in tanks which has the vertical outlet tube thereof selectively vertically adjustable over a relatively wide range of vertical heights and is retained in any selected adjusted position with positive securement which positively resists straight vertical forces which could accidentally change the selected vertical extension. According to the preferred form of the present invention, the outlet tube of the ball cock is formed of end telescoped upper and lower parts which are formed with selectively adjustable, radially interengaged means therebetween which normally resist at least straight vertical forces so as to normally maintain the relative vertical positioning therebetween. At the same time, through selected preplanned manipulation, the telescoping of the outlet tube parts may be changed to increase or decrease the overall height of the ball cock thereby adapting the same to virtually all tank configurations and water level heights within reasonable limitations while still only making the use of a single ball cock model.

In one preferred form of the ball cock of the present invention, the height controlling outlet tube upper and lower parts are formed one with a continuous spiral groove and the other with a radial projection interengaged in such spiral groove so that by relatively rotation between the tube upper and lower parts, the overall height of the ball cock is increased or decreased depending on the direction of rotation. In another preferred form of the ball cock of the present invention, a series of vertically spaced recesses, preferably a series of vertically spaced annular grooves, are formed on one of the height controlling outlet tube upper and lower parts and a radial projection is formed on the other of the parts with release means normally retaining the radial projection interengaged in one of the recesses or annular grooves to normally maintain the preset overall vertical height of the ball cock, but with the release means permitting disengagement of such interengagement for the selective changing of the ball cock overall vertical height and the re-engagement of the radial projection into a different of the recesses or annular grooves. Thus, in either preferred form, the ball cock is positively retained at any of its determined overall vertical heights and against at least straight vertical forces which could accidentally change such height.

Other objects and advantages of the invention will be apparent from the following specification and the accompanying drawings which are for the purpose of illustration only.

DESCRIPTION OF THE BEST EMBODIMENTS CONTEMPLATED

Figure 1:
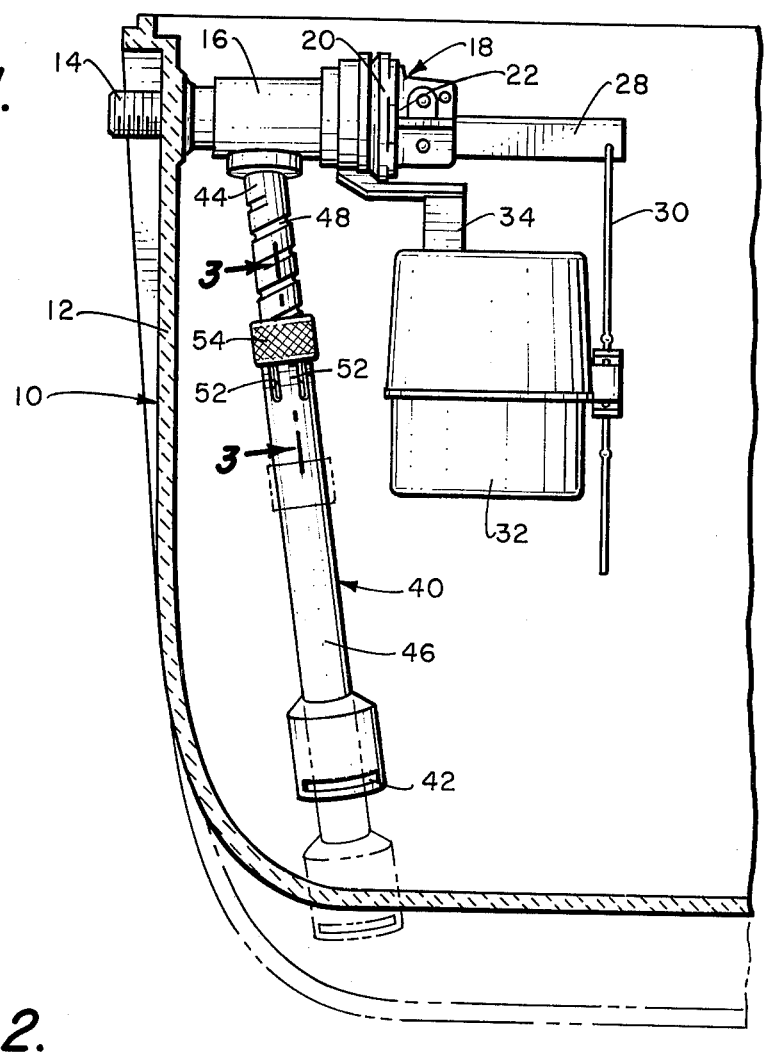
FIG. 1 is a fragmentary, side elevational view of one preferred embodiment of the ball cock of the present invention shown operably installed in a toilet water tank, the water tank being shown in vertical section.

One preferred embodiment of the ball cock of the present invention is shown in FIGS. 1 through 4 installed in a conventional toilet water flush tank generally indicated at 10. As general environment for the present invention, the ball cock is generally of a known side inlet type secured to a tank sidewall 12 by a generally horizontal, water inlet tube 14 of the ball cock extending through the tank sidewall having an outer end positioned for connection to a supply of pressurized water. Inwardly of the tank sidewall 12, the water inlet tube 14 is telescoped by a water outlet housing 16 of the ball cock abutting the tank sidewall to effect the ball cock positioning.

Preferably integrally secured to an inner end of the water outlet housing 16 spaced from the tank sidewall 12 is a water flow controlling valve assembly generally indicated at 18 and an inner end of the water inlet tube 14 is secured communicating centrally into a valve seat part 20 of such valve assembly. Furthermore, a valve cover part 22 of the valve assembly received within the valve seat part 20 retains a resilient valve seal 24 sealing off the inner end of the inlet tube 14 in valve closed position, while permitting a flow of water from the inlet tube and through the valve assembly in valve open position. The open or closed position of the valve assembly 18 is determined by a generally horizontally movable pilot valve pin 26 which, in turn, is horizontally movable by the pivotal connection of the outer end thereof to a vertically pivotally mounted valve operating lever 28. Briefly, when the valve operating lever 28 is pivoted downwardly moving the pilot valve pin 26 to the right as shown in FIG. 2, the valve assembly 18 is moved to open position permitting the flow of water therethrough and when the valve operating lever is pivoted upwardly, the pilot valve pin is moved to the left and the valve assembly is placed in its closed position sealing off the flow of water therethrough, all of which will be more particularly explained.

The upward and downward pivoting of the valve operating lever 28 is controlled by pivotal connection of the valve operating lever outer end through a connecting rod 30 to a vertically movable float 32, as shown in FIG. 1. A float bracket 34 is preferably integrally secured to the water outlet housing 16 and projects vertically downwardly, being vertically movably telescoped by the float 32. Thus, when lowering water level in the tank 10 permits the float 32 to move downwardly causing the valve operating lever 28 to pivot downwardly, the valve assembly 18 is placed in open position and when rising water level in the tank moves the float upwardly to pivot the valve operating lever upwardly, the valve assembly is ultimately placed in closed position.

Figure 2:
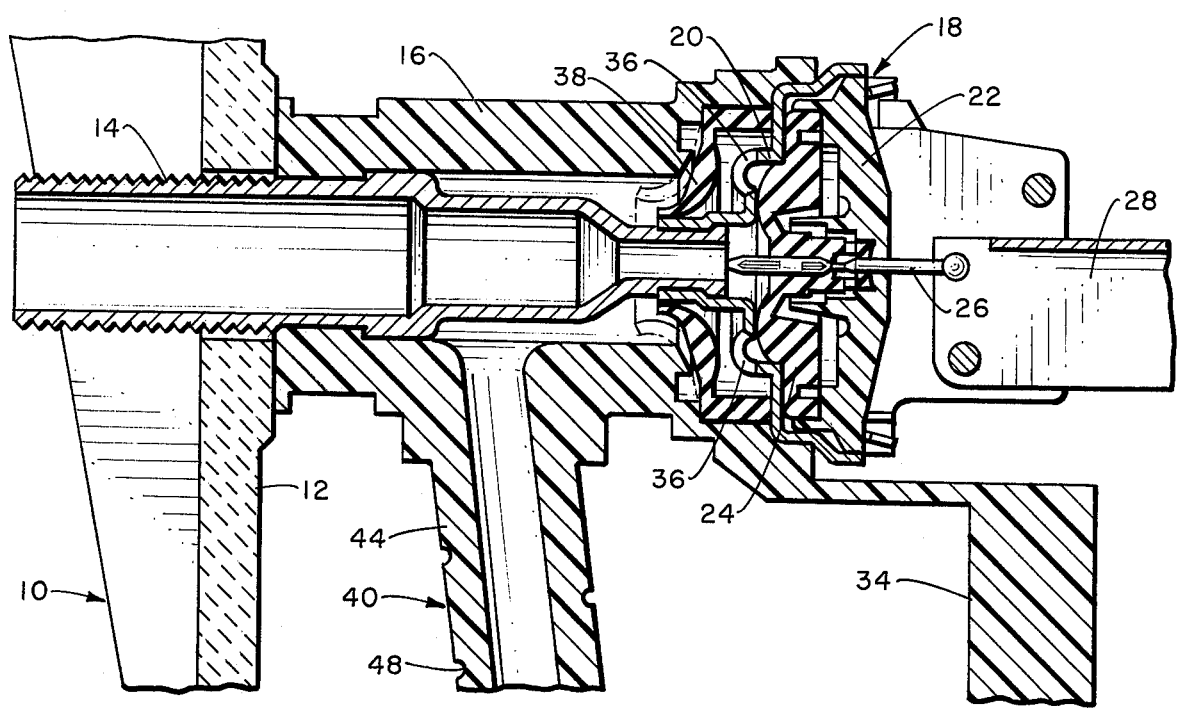
FIG. 2 is an enlarged, fragmentary, vertical sectional view taken from FIG. 1, but showing a portion of the ball cock in vertical section.

More particularly to the internal construction of the valve assembly 18, movement of the pilot valve pin 26 to the left into the position shown in FIG. 2 permits water under pressure from the inlet tube 14 to flow around the pilot valve pin and between the valve cover part 22 and the valve seal 24 thereby forcing the valve seal against the valve seat part 20 and sealing off water flow from the inlet tube. Movement of the pilot valve pin 26 to the right permits the water between the valve cover part 22 and the valve seal 24 to be exhausted outwardly through the valve cover part around the pilot valve pin as forced by the pressurized water supply from the inlet tube 14 forcing against the valve seal, which in turn, forces the valve seal away from the valve seat part 20 permitting the water from the inlet tube to enter the valve seat part radially outwardly along the valve seal and exit into the water outlet housing 16 through valve outlet openings 36. Obviously, the first described condition is the valve closed position of the valve assembly 18 and the second described condition is the valve open position, all as controlled by the water level in the tank 10 through the float 32 as previously described. Furthermore, completing the general environment for the principles of the present invention, as the flow of pressurized water supply from the inlet tube 14 continues through the valve outlet openings 36 of the valve seat part 20, it forces a resilient, anti-syphon flipper 38 to expand radially outwardly so that the water flows reversely into the water outlet housing 16 radially outwardly around the inlet tube and downwardly into a water outlet tube generally indicated at 40 ultimately exhausting into a lower portion of the inner confines of the tank 10 through a lower end outlet opening 42.

Figure 3:
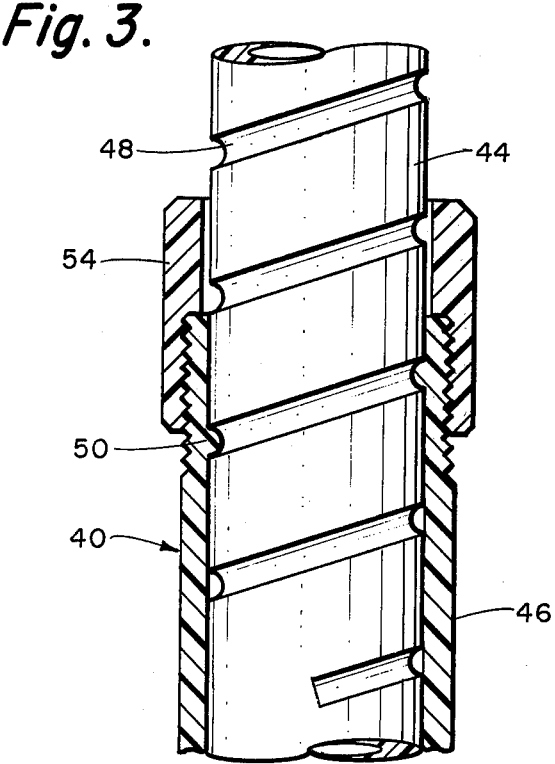
FIG. 3 is an enlarged, fragmentary, vertical sectional view looking in the direction of the arrows 3—3 in FIG. 1 and showing details of the vertically adjustable outlet tube of the ball cock of FIG. 1.
Figure 4:
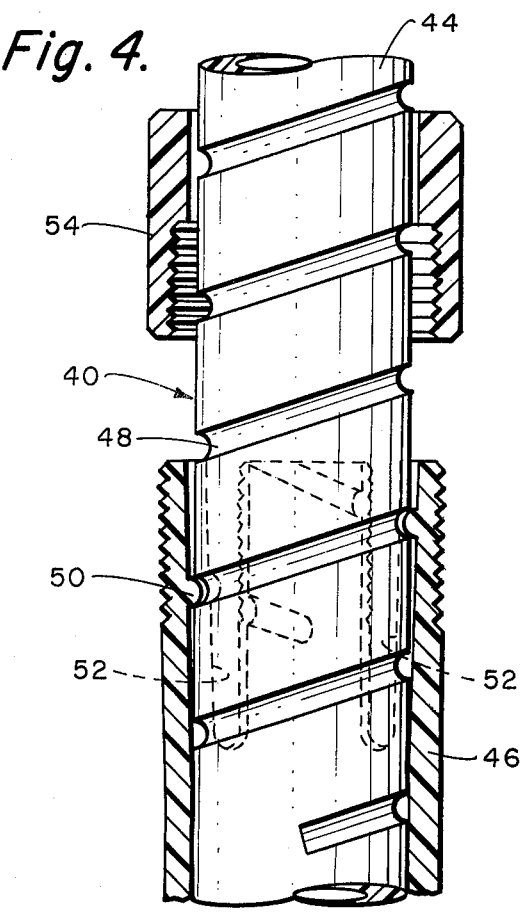
FIG. 4 is a view similar to FIG. 3, but with the ball cock outlet tube upper and lower parts in a releasing position.

More particularly to the novel vertically adjustable outlet tube principles of the present invention, the water outlet tube 40 is formed of end telescoped, upper and lower parts 44 and 46, in this particular instance, the lower part being end telescoped over the upper part, and appropriate slideable, resilient radial seals, not shown, may be positioned between these upper and lower parts so that proper water communication is maintained despite the relative vertical positioning or telescoping of such parts. Most important, however, normally radially interengaged adjustment means is provided between the outlet tube upper and lower parts 44 and 46 in the form of a continuous spiral groove 48 in the outer surface of the outlet tube upper part 44 normally radially interengaged by a matching spiral radial projection 50 on the inner surface of the outlet tube lower part 46. The spiral groove 48 on the outlet tube upper part 44 preferably extends the major portion of the vertical height of the outlet tube upper part but important to certain of the principles of the present invention, this spiral groove terminates spaced slightly upwardly from the upper part lower extremity as seen in FIGS. 3 and 4. The spiral radial projection 50 on the outlet tube lower part 46, however, need only extend a relatively short distance, preferably approximately one and one quarter circumferences of the lower part inner surface.

A multiplicity, preferably four, equally circumferentially spaced and axially extending slots 52 are formed through the upper extremity of the outlet tube lower part 46 with the slots opening upwardly of the tube lower part and the spiral radial projection 50 thereof is directly radially inwardly of the slots. A vertically slideable lock collar 54 is assembled telescopically surrounding the outlet tube lower part 46 and is normally positioned surrounding this slotted upper extremity sized to retain the tube lower part radially inwardly against the outlet tube upper part 44 and the radial projection 50 radially interengaged within the spiral groove 48 of the respective tube parts. At least the slotted outlet tube lower part 46 is preferably formed of a slightly flexible, yet quite stiff and rigid plastic, such slight flexibility being for a purpose to be explained.

Thus, with the lock collar 54 positioned at the upper extremity of the outlet tube lower part 46 as shown in FIGS. 1 and 3, retaining the radial projection 59 interengaged in the spiral groove 48, relative rotation between the outlet tube upper and lower parts 44 and 46 will cause telescoped extension and retraction of the outlet tube 40, thereby selectively vertically adjusting the overall height of the particular ball cock as far as its maximum downward vertical extension within the tank 10. At the same time, due to the positive interengagement between the outlet tube spiral groove 48 and radial projection 50, straight upward or downward vertical forces on the ball cock will not accidentally reduce or extend the vertical height thereof. Furthermore, since the spiral groove 48 on the outlet tube upper part 44 terminates its continuous spiral extension spaced slightly upwardly from the tube upper part lower extremity, as long as the lock collar 54 is at the upper extremity of the outlet tube lower part 46 retaining the radial projection 50 interengaged with the spiral groove 48, relative rotation will always be forced to stop short of completely vertically separating the outlet tube upper and lower parts 44 and 46. However, by threadably disengaging the lock collar 54 upwardly from the upper end extremity of the outlet tube lower part 46 along the upper part 44 as shown in FIG. 4, the slots 52 in the upper extremity of the lower part 46 will permit slight outward flexing of the lower part upper extremity to disengage the radial projection 50 from the spiral groove 48, in turn, permitting complete separation and/or reassembly of the various outlet tube upper and lower parts.

In this first embodiment form of the vertically adjustable outlet tube principles of the present invention, therefore, positive radial interengagement is normally maintained between the outlet tube upper and lower parts 44 and 46 which resists any accidental changing of the telescoped relationship thereof by at least substantially straight vertical forces which could change the overall vertical height of the ball cock from that originally selectively set. Such radial interengagement is maintained through a recess or recesses of one part receiving a radial projection of the other part maintaining the relative selected vertical positioning. Furthermore, with the recess or recesses in the form of the spiral groove 48 of this first embodiment, even though there is positive retainment of a selective relative positioning between the outlet tube upper and lower parts 44 and 46, the positioning thereof to increase or decrease the end telescoping thereof may be easily changed merely by selective rotation of the outlet tube lower part 46 relative to the upper part 44, the radial projection 50 moving upwardly or downwardly along the spiral groove 48 to thereby decrease or increase the overall length of the outlet tube 40 to adapt the ball cock to different tank depths as shown in comparing the full and phantom lines in FIG. 1.

This spiral groove 48 and radial projection 50 arrangement of the outlet tube upper and lower parts 44 and 46 of this first embodiment also lends itself to a construction wherein total separation during telescoping adjustment may be prevented. As hereinbefore described, merely by terminating the spiral groove 48 short of the lower extremity of the outlet tube upper part 44, selective relative rotation between the outlet tube upper and lower parts 44 and 46 is positively terminated short of such complete separation. At the same time, however, by manipulation of the lock collar 54 and the flexing permitted by the slots 52, complete separation of the outlet tube upper and lower parts 44 and 46 may be simply accomplished as described when actually intended.

Figure 5:
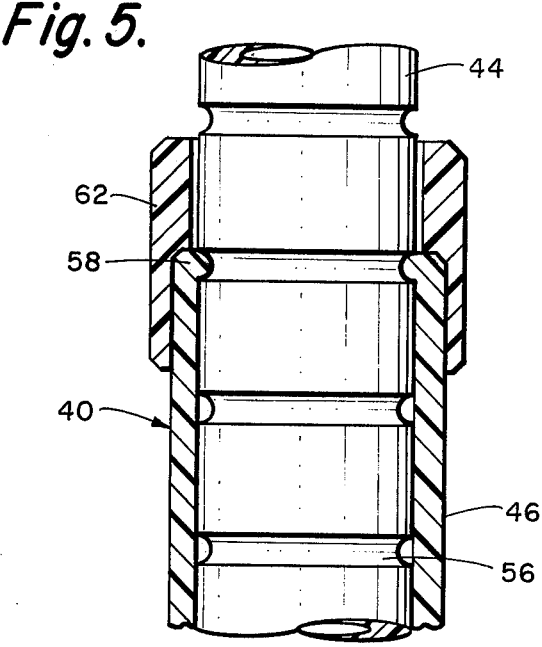
FIG. 5 is a view similar to FIG. 3, but showing a second embodiment of the vertically adjustable outlet tube of the ball cock.
Figure 6:
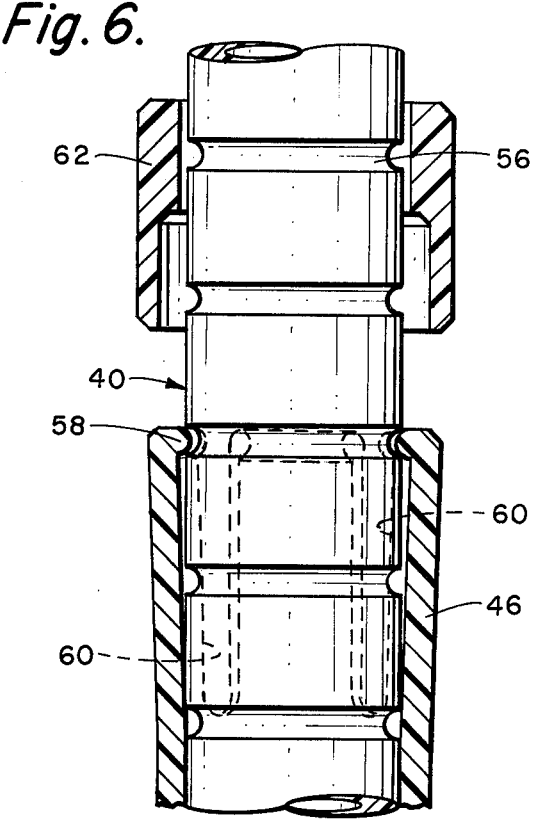
FIG. 6 is a view similar to FIG. 5, but with the ball cock outlet tube upper and lower parts in a releasing position.

The second embodiment of the unique vertically adjustable outlet tube principles of the present invention is illustrated in FIGS. 5 and 6 and the change therein relates to the particular form of recesses or grooves and the radial projection. As shown in FIG. 5, the outlet tube upper part 44 has a series of vertically or axially spaced recesses in the form of vertically spaced annular grooves 56 along the outer surface thereof, and the upper extremity of the lower part 46 is formed with a radially inward projection in the form of an annular projection 58 on the inner surface thereof. The upper extremity of the lower part 46, similar to the first embodiment, has vertically or axially extending and upwardly opening, circumferentially spaced slots 60 and a threaded lock collar 62 is again threadably received over the upper extremity of the lower part completing the structure.

Thus, with the lock collar 62 positioned in place over the upper extremity of the outlet tube lower part 46 as shown in FIG. 5, this lock collar retains the outlet tube lower part inwardly against the outlet tube upper part 44 so as to retain the annular projection 58 extending into any given of the annular grooves 56. This will, of course, maintain a determined vertical adjustment of the outlet tube upper and lower parts 44 and 46 so as to maintain a determined overall vertical dimension for the particular ball cock. Removal of the lock collar 62 upwardly from the outlet tube lower part 46, however, will permit outward flexing of the outlet tube lower part so as to disengage the annular projection 58 from the particular annular groove 56 and, in turn, permit a desired vertical telescoped adjustment between the upper and lower parts 44 and 46 or even complete disassembly thereof, if desired and intended.

Thus, again, a determined overall vertical length for the outlet tube 40 may be maintained by the radial interengagement of the annular projection 58 radially into the selected of the annular grooves 56 and will resist in a very positive manner any accidental alteration of such positioning. If, however, the overall vertical length of the outlet tube 40 is desired to be changed, by simple manipulation of the lock collar 62, the positive radial interengagement may be temporarily eliminated in the manner shown in FIG. 6 and direct radial interengagement reestablished between the annular projection 58 and a different of the annular grooves 56 with the outlet tube upper and lower parts 44 and 46 in a new telescoped positioning. Still additionally, complete separation of the outlet tube upper and lower parts 44 and 46 may be intentionally accomplished by the same manipulation procedure.

I claim:

1. In a ball cock for controlling the level of liquids such as water in a tank, the ball cock being of the type having an inlet tube with an outer end in communication with a water supply through a tank wall, a generally vertical outlet tube for the flow of water downwardly therethrough within said tank, a float controlled valve between an inner end of said inlet tube and an upper end of said outlet tube, and a water outlet opening communicating into said tank at a lower end extremity of said outlet tube; the improvements comprising: said outlet tube having vertically end telescoping upper and lower parts internally vertically communicating during varying amounts of said vertical end telescoping; generally radially extending and interengaged adjustment means between said tube upper and lower parts normally positively resisting at least straight vertical movement between said tube upper and lower parts but being selectively operable for increasing and decreasing said tube upper and lower part end telescoping to selectively vary the downward vertical extension of said outlet tube from said valve, said adjustment means including a spiral groove on one of said outlet tube upper and lower parts and a rigid radial projection on the other of said upper and lower parts, said rigid radial projection normally being positively engaged into said spiral groove with relative rotation between said tube upper and lower parts causing increasing and decreasing of said tube upper and lower part end telescoping, said adjustment means also including selectively operable release means operable at any upper and lower part end telescoping for permitting upon operation thereof total radial separation between said spiral groove and said rigid radial projection to thereby permit free relative vertical movement as well as complete vertical separation between said outlet tube upper and lower parts.

2. In a ball cock for controlling the level of liquids such as water in a tank, the ball cock being of the type having an inlet tube with an outer end in communication with a water supply through a tank wall, a generally vertical outlet tube for the flow of water downwardly therethrough within said tank, a float controlled valve between an inner end of said inlet tube and an upper end of said outlet tube, and a water outlet opening communicating into said tank at a lower end extremity of said outlet tube; and improvements comprising: said outlet tube having vertically end telescoping upper and lower parts internally vertically communicating during varying amounts of said vertical end telescoping; generally radially extending and interengaged adjustment means between said tube upper and lower parts normally positively resisting at least straight vertical movement between said tube upper and lower parts but being selectively operable for increasing and decreasing said tube upper and lower part end telescoping to selectively vary the downward vertical extension of said outlet tube from said valve, said adjustment means including a spiral groove on one of said outlet tube upper and lower parts and a radial projection on the other of said upper and lower parts, said radial projection normally extending into said spiral groove with relative rotation between said upper and lower parts causing increasing and decreasing of said upper and lower part end telescoping, said spiral groove terminating spaced from its tube part telescoping end termination normally preventing vertical separation of said upper and lower parts during said engagement of said spiral groove by said radial projection, an outer of said upper and lower parts having circumferentially spaced and generally vertically extending slots formed in said part telescoped end and opening vertically of said end, a lock collar surrounding said outer part end and maintaining said radial projection engaged in said spiral groove, vertical displacement of said lock collar from said outer part end permitting radial outward disengagement between said radial projection and said spiral groove by virtue of said slots to permit complete vertical separation between said inlet and outlet tube upper and lower parts.

3. In a ball cock for controlling the level of liquids such as water in a tank, the ball cock being of the type having an inlet tube with an outer end in communication with a water supply through a tank wall, a generally vertical outlet tube for the flow of water downwardly therethrough within said tank, a float controlled valve between an inner end of said inlet tube and an upper end of said outlet tube, and a water outlet opening communicating into said tank at a lower end extremity of said outlet tube; the improvements comprising: said outlet tube having vertically end telescoping upper and lower parts internally vertically communicating during varying amounts of said vertical end telescoping; generally radially extending and interengaged adjustment means between said tube upper and lower parts normally positively resisting at least straight vertical movement between said tube upper and lower parts but being selectively operable for increasing and decreasing said tube upper and lower part end telescoping to selectively vary the downward vertical extension of said outlet tube from said valve, said adjustment means including a series of vertically spaced recesses on one of said outlet tube upper and lower parts and a projection on the other of said upper and lower parts with said projection normally extending into one of said recesses resisting said at least straight vertical movement between said upper and lower parts, release means normally retaining said projection extending into one of said recesses selectively operable for permitting separation of said projection and said one recess for selectively increasing and decreasing said upper and lower part end telescoping and positioning of said projection extending into another of said recesses, said release means being formed by generally vertically extending and vertically opening slots on an outer of said part telescoping ends normally circumscribed by a lock collar retaining said projection extending into one of said recesses, vertical displacement of said lock collar permitting said separation of said projection and recess.

4. In a ball cock for controlling the level of liquids such as water in a tank, the ball cock being of the type having an inlet tube with an outer end in communication with a water supply through a tank wall, a generally vertical outlet tube for the flow of water downwardly therethrough within said tank, a float controlled valve between an inner end of said inlet tube and an upper end of said outlet tube, and a water outlet opening communicating into said tank at a lower end extremity of said outlet tube; the improvements comprising: said outlet tube having vertically end telescoping upper and lower parts internally vertically communicating during varying amounts of said vertical end telescoping; generally radially extending and interengaged adjustment means between said tube upper and lower parts normally positively resisting at least straight vertical movement between said tube upper and lower parts but being selectively operable for increasing and decreasing said tube upper and lower part end telescoping to selectively vary the downward vertical extension of said outlet tube from said valve said adjustment means including groove means extending at various vertical heights on one of said outlet tube upper and lower parts and projection means on the other of said upper and lower parts, said groove means and projection means normally being interengaged at said groove means various vertical heights resisting said at least straight vertical movement between said upper and lower parts, certain of said upper and lower parts having slot means selectively operable for permitting release of said groove means and projection means from said interengagement to permit relative vertical movement between said upper and lower parts.

* * * * *